Patented Mar. 7, 1939

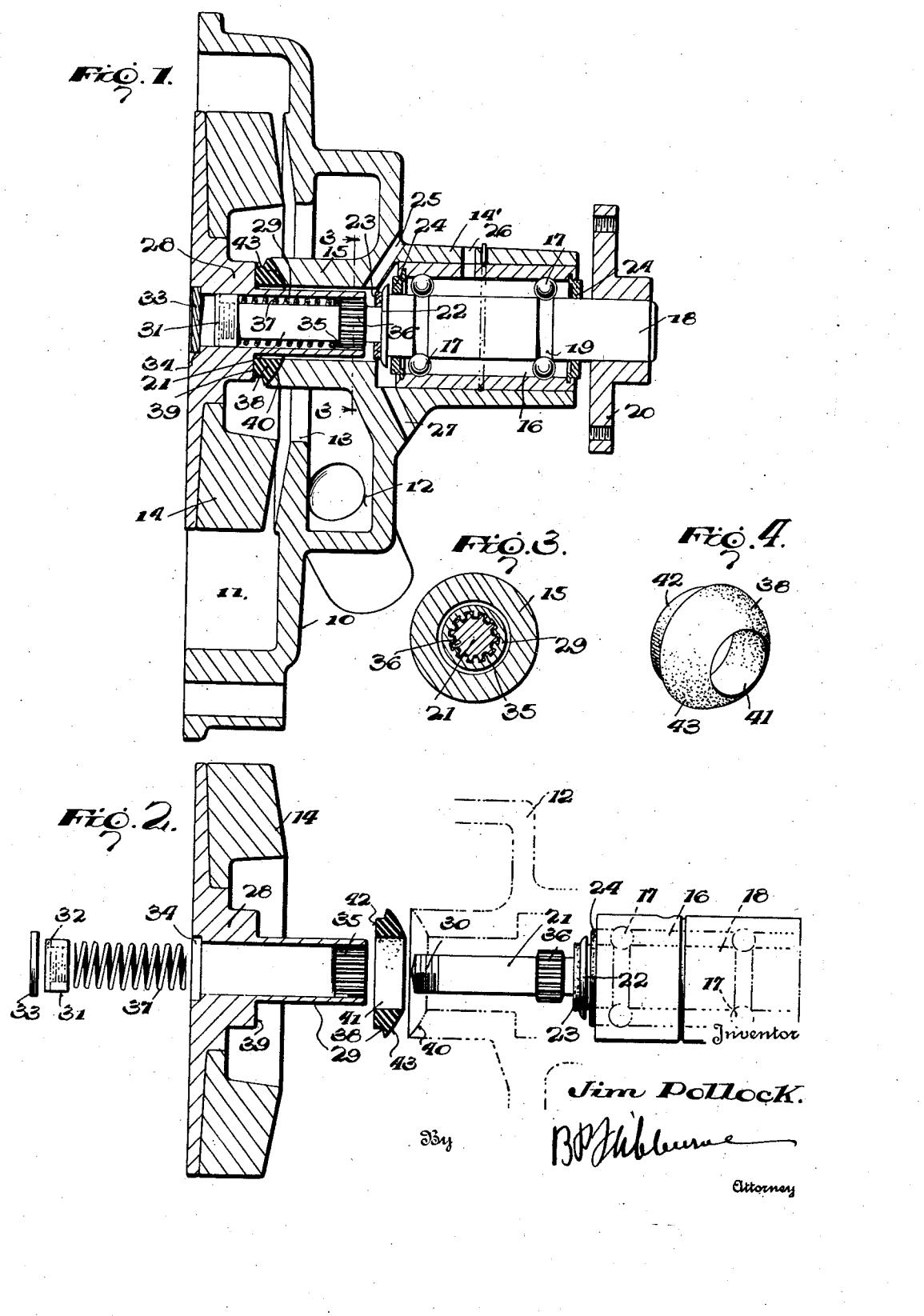

2,150,078

UNITED STATES PATENT OFFICE 2,150,078

DRIVING AND SEALING MEANS FOR ROTARY FLUID IMPELLERS

Jim Pollock, Vinton, Iowa

Application June 28, 1938, Serial No. 216,333

2 Claims. (Cl. 103—111)

My invention relates to driving means for a rotary fluid impeller and sealing means to prevent the escape of the fluid.

Important objects of the invention are to provide a driving coupling between the shaft and impeller; to provide a self adjusting sealing means to prevent of the escape of the fluid about or in proximity to the driving shaft; to provide means for the lubrication of all working parts; to eliminate the noises often encountered in connection with apparatus of this type; to provide means for the elimination of organic material as packing means; to provide means whereby a hard bearing element, such as carbon, may be employed for effecting the sealing, and which may be lubricated; to provide means whereby a spring is employed to automatically compensate for wear and retain the hard packing element in proper engagement with its seat, eliminating the necessity of using a thrust washer or other device; to provide a sealing means having a minimum number of contacting or sealing surfaces; to provide a sealing means which is simple and compact and in which the wear and failure in action is reduced to the minimum; to provide means to automatically take up the wear upon the seat.

Other objects and advantages of the invention will be apparent during the course of the following description.

In the accompanying drawing forming a part of this application and in which like numerals are employed to designate like parts throughout the same, Figure 1 is a central vertical longitudinal section through apparatus embodying my invention, Figure 2 is an exploded side elevation of the device, parts in section, and parts omitted, Figure 3 is a transverse section taken on line 3—3 of Figure 1, and Figure 4 is a perspective view of the sealing element.

In the drawing, wherein for the purpose of illustration is shown a preferred embodiment of my invention, the numeral 10 designates a pump casing such as is included in the water cooling system of an internal combustion engine, although the casing 10 may be included in a pump for handling any other liquid or gas. The pump casing includes a large chamber 11 and a smaller chamber 12, in free communication therewith, through a large passage or opening 13. Rotatably mounted within the chamber 11 is an impeller 14. Formed integral with the chamber 12 is a bearing receiving and holding sleeve 14', disposed exteriorly of the chamber 12 at one end thereof. Also preferably formed integral with the end of the chamber 12 and disposed interiorly thereof is a sealing sleeve 15. The sleeves 14' and 15 are disposed in end to end relation, the sealing sleeve 15 extending through the opening or passage 13, and sleeve 14', sealing sleeve 15, chamber 12 and chamber 11 are disposed in concentric relation.

Suitably fixedly mounted within the sleeve 14' is a combined radial and end thrust bearing 16, shown as a ball bearing, but the invention is not restricted to the use of a ball bearing, as a roller bearing, or any other type of bearing may be used which is a combined radial and end thrust bearing. The ball bearing 16 includes bearing balls 17, as shown.

Extending through the bearing 16 is an impeller shaft 18, having annular races 19 to receive the bearing balls 17. Mounted upon the outer end of the impeller shaft 18, for rotation therewith, is a coupling 20, to be secured to a rotary driving element, such as a pulley, or a fan hub having a pulley, which is the usual practice in the motor car industry. Rigidly secured to the inner end of the impeller shaft 18 and preferably formed integral therewith is a coupling shaft 21, having a considerably smaller diameter than the shaft 18. A sling ring 22 is disposed at the inner end of the impeller shaft 18 and a felt retainer 23 is disposed forwardly of this sling ring. Felt retainers 24 are also arranged at the ends of the bearing 16, as shown. The numeral 25 designates a port or duct leading into the sealing sleeve 15 forwardly of the felt retainer 23, through which a suitable lubricant may be fed. The numeral 26 also designates a lubricant feeding port or duct, leading into the ball bearing 16 between the felt retainers 24. The numeral 27 designates a drain port or duct, leading into the rear end of the sealing sleeve 15, for the drainage of any possible leakage of water or other fluid being pumped, which would eliminate the possibility of any fluid, such as a cooling fluid or other corrosive liquid from gaining access to the bearing 16.

The impeller 14 has a tubular hub 28 including a coupling tube 29, to receive the coupling shaft 21. The exterior diameter of the coupling shaft 21 is considerably smaller than the interior diameter of the coupling tube 29, and since these parts are concentric, they are retained permanently spaced. The forward end of the coupling shaft 21 is screw-threaded, as shown at 30 for engagement with the screw-threaded opening of a cylindrical nut 31, arranged within the cylindrical bore of the tubular hub. The forward end of this nut 31 is closed and it has a groove 32 for the reception of a screw driver. The nut 31 is permanently spaced from a welch plug 33, or other sealing element, held within the annular groove 34. The space between the nut and the welch plug is permanently maintained, when the surface of the sealing elements wear.

Preferably formed integral with the rear end of the coupling tube 29 is an annular set of spaced ribs or splines 35, extending longitudinally of the coupling tube 29 and parallel with the longitudinal axis of the same. A companion annular set of spaced ribs or splines 36 are preferably formed integral with the coupling shaft 21, near its rear end, and the ribs or splines 36 extend parallel to the longitudinal axis of the coupling shaft 21. When the parts are assembled, as shown in Figure 1, the ribs or splines 36 interfit with the ribs or splines 35, and produce a splined connection between the coupling shaft 21 and the coupling tube 29, so that they rotate together, but may partake of relative longitudinal movement. Particular attention is called to the fact that the ribs or splines 35 are longer than the ribs or splines 36 and project at their forward ends beyond the ribs or splines 36, which projection is maintained, notwithstanding the fact that the sealing elements may wear. Now I prefer to use the annular sets of ribs 35 and 36 to produce the splined connection, yet the invention is not necessarily restricted to this arrangement. Surrounding the coupling shaft 21 within the coupling tube 29 is a suitably stiff compressible coil spring 37, engaging at its forward end with the nut 31, and at its rear end with the forward ends of the ribs or splines 35, projecting forwardly beyond the ribs or splines 36.

The numeral 38 designates an annular sealing disk, preferably formed of carbon or other hard inorganic material, which may be lubricated by oil or grease. This annular sealing disk 38 is arranged between the shoulder 39 of the hub 28 and the seat 40 of the sealing sleeve 15, as shown. The annular sealing element has a bore 41, which is preferably of the same diameter as the bore of the sealing sleeve 15, and is therefore considerably larger than the exterior diameter of the coupling tube 29, whereby the annular sealing disk 38 is permanently retained out of contact with the coupling tube 29. This is important, as it renders the annular sealing disk permanently self adjusting upon its seat. The shoulder 39 is flat and is perpendicular to the central longitudinal axis of the hub and this shoulder engages the flat face 42 of the annular sealing element 38, which flat face is also perpendicular to the central longitudinal axis of the annular sealing element. At its rear end, the annular sealing element has a spherically curved face 43, for engaging the spherically curved seat 40, formed upon the sealing sleeve 15. This sealing sleeve 15 may be formed of metal, such as steel or iron and may be an integral part of the pump casing, although it may be a separate part, such as a bushing. The seat 40 is preferably formed of or in some hard metal, such as iron or steel.

In view of the foregoing description, it will be seen that the expansion of the spring 37 acting upon the splines or ribs 35 will tend to shift the impeller rearwardly against the annular sealing element 38, retaining it in proper engagement with its seat 40. There may be a slight relative angular movement between the sets of ribs or splines 35 and 36, sufficient to permit of the sealing element to automatically adjust itself upon its seat 40. As the wear between the faces 42 and 43 occurs, the same is taken up by the action of the spring 37. It is thus seen that the sealing element 38 has two points of contact, one with the hub 28 and the other with the seat 40. A single sealing element is thus employed with only two points of contact, thus reducing the possibility of the escape of water or other liquid to the minimum. The sealing element 38 is free from contact with the coupling tube 29 and floats thereon and is thereby at all times free to automatically adjust itself upon its seat. The rotation of the shaft 18 is imparted to the impeller 14 through the spline connection, as is obvious.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:

1. In apparatus of the character described, a casing having an internal sealing sleeve provided with a spherically curved seat, a rotary impeller within the casing and having a hub provided with a tubular part extending into the sealing sleeve, the tubular part having an exterior diameter considerably less than the interior diameter of the sleeve to afford a space between the same, an annular sealing disk surrounding said part and disposed between the hub and the sealing sleeve, the annular sealing disk having an internal diameter considerably greater than the external diameter of said tubular part so that there is a space between the same, said sealing disk having one end engaging the hub and its opposite end having a spherically curved face engaging the spherically curved seat, a bearing, a shaft rotatable within the bearing and having a part extending into the tubular part, means effecting a splined connection between the tubular hub part and the shaft part, and a spring arranged within the tubular hub part and reacting against the shaft at one end and against the tubular part at the other end and serving to move the same toward the spherically curved seat.

2. In apparatus of the character described, a casing for receiving a fluid and having an internal sealing sleeve provided at its end with a spherically curved seat, said sleeve having a port for the entrance of a lubricant, an impeller within the casing having a hub provided with a tubular portion extending into the sealing sleeve for a considerable distance, an annular sealing element surrounding the tubular portion and arranged between the hub and spherically curved seat and having a spherically curved face to engage the spherically curved seat, a fixed bearing sleeve arranged exteriorly of the casing, a radial and end thrust bearing within the bearing sleeve, a rotary shaft within the bearing, a coupling shaft secured to the rotary shaft and extending into the tubular portion, a set of longitudinal ribs formed upon the inner surface of the tubular portion, a coacting set of longitudinal ribs formed upon the coupling shaft and interfitting with the first named set, the engaging sets of ribs permitting of a limited angular movement of said tubular portion with relation to the internal sleeve, a nut carried by the coupling shaft, and a compressible coil spring surrounding the coupling shaft and engaging the nut and the set of ribs formed upon the tubular portion.

JIM POLLOCK.